MONOLITHICALLY FABRICATED SENSE AMPLIFIER-THRESHOLD DETECTOR

Filed April 22, 1966 2 Sheets-Sheet 1

INVENTOR
ROBERT ORDOWER
BY John C. Black
ATTORNEY

United States Patent Office 3,461,318

Patented Aug. 12, 1969

3,461,318

MONOLITHICALLY FABRICATED SENSE AMPLIFIER-THRESHOLD DETECTOR

Robert Ordower, Vestal, N.Y., assignor to International Business Machines Corporation, Armonk, N.Y., a corporation of New York Filed Apr. 22, 1966, Ser. No. 544,467
Int. Cl. H03k 5/20
U.S. Cl. 307—235 9 Claims

ABSTRACT OF THE DISCLOSURE

A sense amplifier includes a plurality of cascade-connected transistor amplifiers of the same conductivity type having the characteristic at saturation of a larger base-emitter voltage drop than the emitter-collector voltage drop. Direct current bias for each amplifier is determined by providing negative feedback around the major loop of the sense amplifier and by utilizing the base-emitter drop of each amplifier together with the collector resistor and supply potential of the next preceding amplifier to set a precise collector bias current in the latter amplifier. This obviates the need to compensate for level shift problems from amplifier to amplifier.

Figure 1:
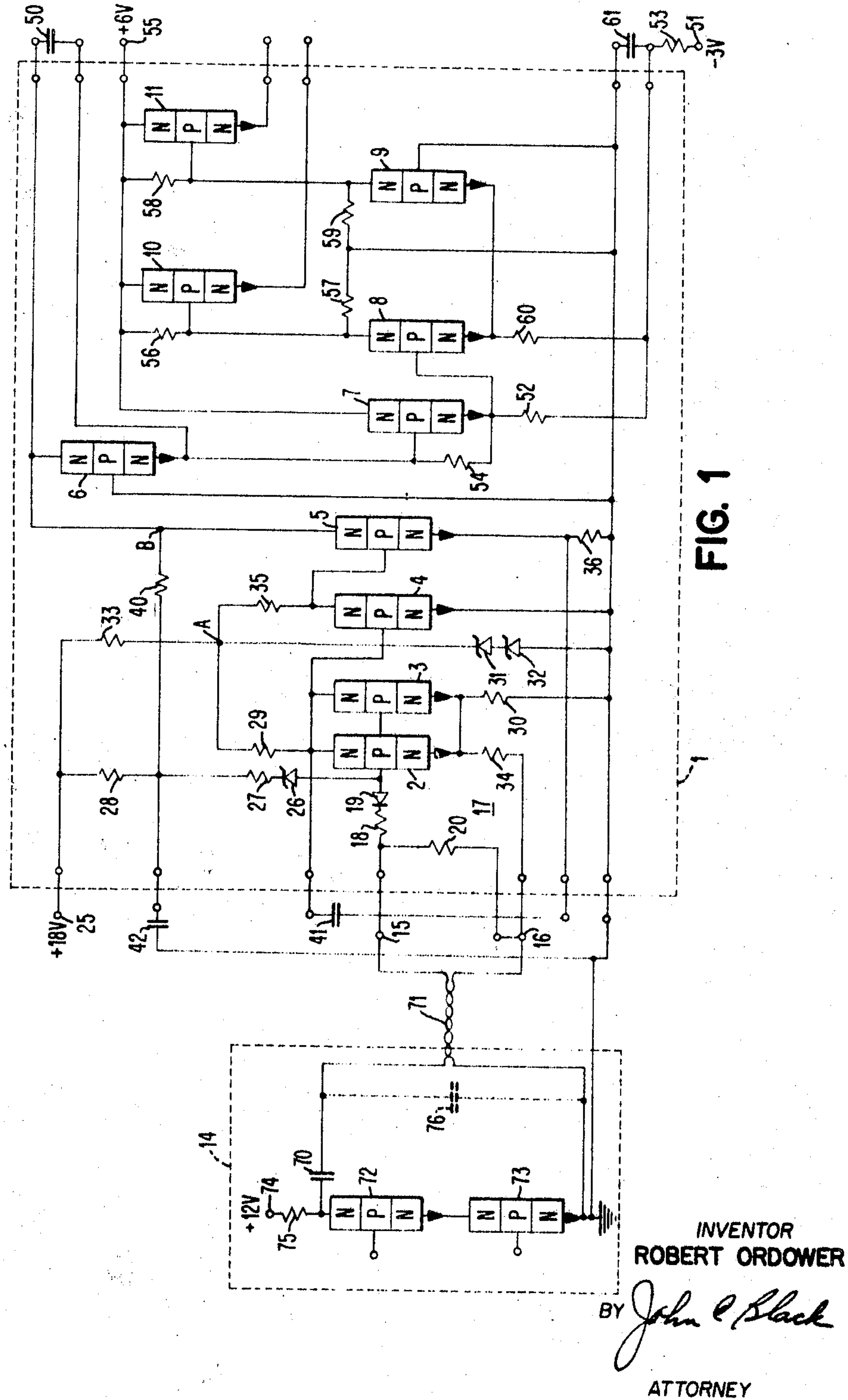

The base-emitter junction of the input (first stage) amplifier is preferably connected in parallel with a similarly poled, matched transistor of the same conductivity type having its base-collector electrodes short-circuited, whereby good common mode rejection is assured even where the input lines are unbalanced and whereby gain stability in the input amplifier is assured.

An improved, frequency insensitive threshold detector coupled to the sense amplifier output includes an input grounded base transistor switch, an output transistor switch and an emitter follower coupling the output switch to the input switch. A capacitor couples input signals above the threshold around the input switch to the emitter follower, turning the input switch off and the output switch on. At the termination of the input signal, the input switch rapidly discharges the capacitor; and a resistor across the base-emitter junction of the emitter follower presents a high impedance to the capacitor during signal duration to maintain charging of the capacitor to a low linear rate.

Summary of the invention

This invention relates to a monolithically fabricated sense amplifier and sense amplifier-threshold detector which is particularly well adapted to detect output data signals from either a capacitor or magnetic core-storage array.

The improved amplifier-detector circuit is adapted for use with storage arrays operated at high frequency rates and is characterized by minimum sensitivity to the data pulse rate, width, and (for a capacitor storage array) fall time.

The output data signals of each of the two types of storage arrays significantly differ. For example, each capacitor storage element or device produces an output pulse which is in the nature of a sharply spiked, differentiated signal; and it applies a current signal to the sense amplifier, with which it is associated. The input impedance of the amplifier is extremely low, thereby providing the proper termination for the signal source and resulting in small delays due to stray capacitance across the input line. In addition, since the input signal is differentiated, it becomes necessary to provide within the sense amplifier a suitable integrating means in order to produce an output signal from the amplifier, whose magnitude is independent of the driver fall time.

Core storage elements on the other hand, produce generally sinusoidal voltage output waveforms. As a result the sense amplifier should have a higher input impedance than that required for the capacitor storage array; and there is no need for integration of the signal.

So far as is known, attempts to design sense amplifiers for the capacitive and core storage devices have been characterized by the assumption that, because of the differences in the output signals produced and in the amplifier input impedance requirements necessitated thereby, different designs were necessary for the respective sense amplifiers.

In the interest of economy, it is of importance to provide where possible, circuits which can be utilized in more than one environment so that the duplication of design effort and the stock piling of an excessive number of circuit types can be obviated. This becomes of even greater importance with the advent of the more frequent design of electronic circuits by monolithic fabrication techniques. Since each circuit which is fabricated by monolithic techniques requires different masks, each of which involves the expenditure of a considerable amount of money, the cost of designing each and every circuit and thereafter developing it to the point of having a final set of suitable masks becomes a significant factor in the overall pricing of the device containing the circuit. Thus it becomes extremely important to design circuits which have applicability to a variety of problems which must be solved.

Accordingly, it is an object of the present invention to design that portion of a sense amplifier which is formed on a single monolithic chip so that it is adapted for use with capacitor and/or core storage arrays.

This object is achieved in a preferred form of the invention by providing a first stage in the sense amplifier which can be adapted to have either a high or low input impedance characteristic.

One of the more important problems which must be initially attacked in the design of any sense amplifier intended for receiving the data output signals of memory is good common mode rejection. This requires that the input circuit of a differential amplifier presents to the common mode signals an extremely high impedance compared with the impedance which it presents to the differential input data signals. For capacitive storage arrays the lines which couple the storage devices to the amplifier input are unbalanced.

In one embodiment of the improved amplifier, a voltage divider means is provided for presenting to noise on the array ground, a substantially balanced line with effective common mode rejection. In a second embodiment of the improved sense amplifier, the input circuit includes one or more transistors connected to operate as diodes shunting the first stage. This input configuration results in noise on the array ground, appearing with approximately equal amplitude at the base and emitter of the input stage, despite unbalanced input lines. Common mode rejection is thereby achieved. In this latter embodiment, the voltage divider means for simulating a balanced line with respect to noise on the array ground is no longer necessary; and the transistor input circuit assures a high degree of gain stability in the first or input stage of the sense amplifier.

Accordingly, it is another object of the present invention to provide an improved sense amplifier with effective common mode rejection.

Another object is the provision of an input amplifier having means for assuring gain stability.

The sense amplifier is in the form of a plurality of cascade-connected transistor amplifiers, each of which is normally biased to a selected point in the linear region of operation.

Another object of the present invention is the provision of an improved direct-current bias means for the transistor amplifiers which permits the use of transistors of the same conductivity type without resorting to additional means to compensate for level shift problems from stage to stage.

In the preferred emebodiment, this latter object is achieved (1) by providing negative feedback around the major loop of the sense amplifier and (2) by utilizing the base-emitter drop of each transistor amplifier together with the collector, reesistor and supply potential of the next preceding transistor amplifier for setting a precise collector bias current in the latter amplifier. For example, one end of the collector resistor of the second last amplifier is connected to a power supply, having a predetermined voltage level. The other end of the resistor is connected directly to the base electrode of the last amplifier. The major loop feedback sets the emitter voltage of said last transistor at a predetermined level, thereby fixing the voltage at its base at a value equal to the sum of its emitter voltage and the base-emitter voltage drop. With known voltages applied to either end of the collector resistor, we can fix the current through said resistor merely by selecting a resistor value which will produce the desired current level. This current through the resistor provides the base current of the last amplifier and the collector current of the second last amplifier. Since both amplifiers are biased to their linear region of operation, the base current of the last amplifier is extremely low in relation to the collector current in the second last amplifier. Therefore, substantially all of the current in the resistor defines the collector bias level of the stage. Starting with the last amplifier and working toward the first, we can in this manner very carefully select the bias levels of each amplifier merely by selecting the values of the collector resistors.

A feature is the use of a capacitor in the major feedback loop for rolling off the loop gain and for providing substantially open loop operation at the selected operating frequency.

Another feature is the biasing of the first stage of the sense amplifier so as to eliminate the usual coupling capacitor which sets the desired high gain at the signal frequency. This is achieved by taking advantage of the matching characteristics of the first stage transistor and its input diodes.

An additional advantage to the improved bias means provided by the direct-current feedback around the major loop in conjunction with the biasing of each stage by means of the base-emitter drop of the next succeeding stage is the ability to provide in the capacitor array sense amplifier an improved integrating means. Known prior art amplifiers of this type relied upon individual biasing of each stage. This in turn necessitated the use in that stage which provided the integration function of a resistor connected in parallel with the integrating capacitor. This resistor is detrimental to the time constant of the circuit and adversely affects the integrating function. With the improved bias means, this resistor is no longer necessary and a significantly improved integrating function is achieved.

It is therefore another object to provide a sense amplifier with improved signal integrating means.

It is another object of the present invention to provide in combination with the improved sense amplifier an improved threshold detector circuit.

The latter object is provided in one embodiment of the invention by coupling the output signals from the sense amplifier to a threshold detector by way of a coupling capacitor and an emitter follower. A grounded base amplifier has its collector and emitter electrodes connected in parallel with the capacitor, whereby in the absence of an input data signal from the sense amplifier, the base-emitter voltage drop of the grounded base amplifier sets a predetermined bias voltage at the base electrode of the emitter follower. The threshold circuit will not respond to any input signals applied to the capacitor unless the signals have an amplitude which equals or exceeds the base-emitter drop of the common base amplifier and the base-emitter drop of the emitter follower. When such an input sigal is applied to the capacitor, the threshold device will switch. At the termination of the pulse, the common base amplifier will again turn on. Feedback within the common base amplifier circuit very rapidly discharges the capacitor, and the voltage at the base electrode of the emitter follower is again clamped by the base-emitter junction of the common base amplifier. This threshold circuit is relatively insensitive to high repetition rates and reliably accepts data signals with pulse width durations at least as low as eighty (80) nanoseconds.

The foregoing and other objects, features and advantages of the invention will be apparent from the following more particular description of preferred embodiments of the invention, as illustrated in the accompanying drawings.

Figures 2, 3:
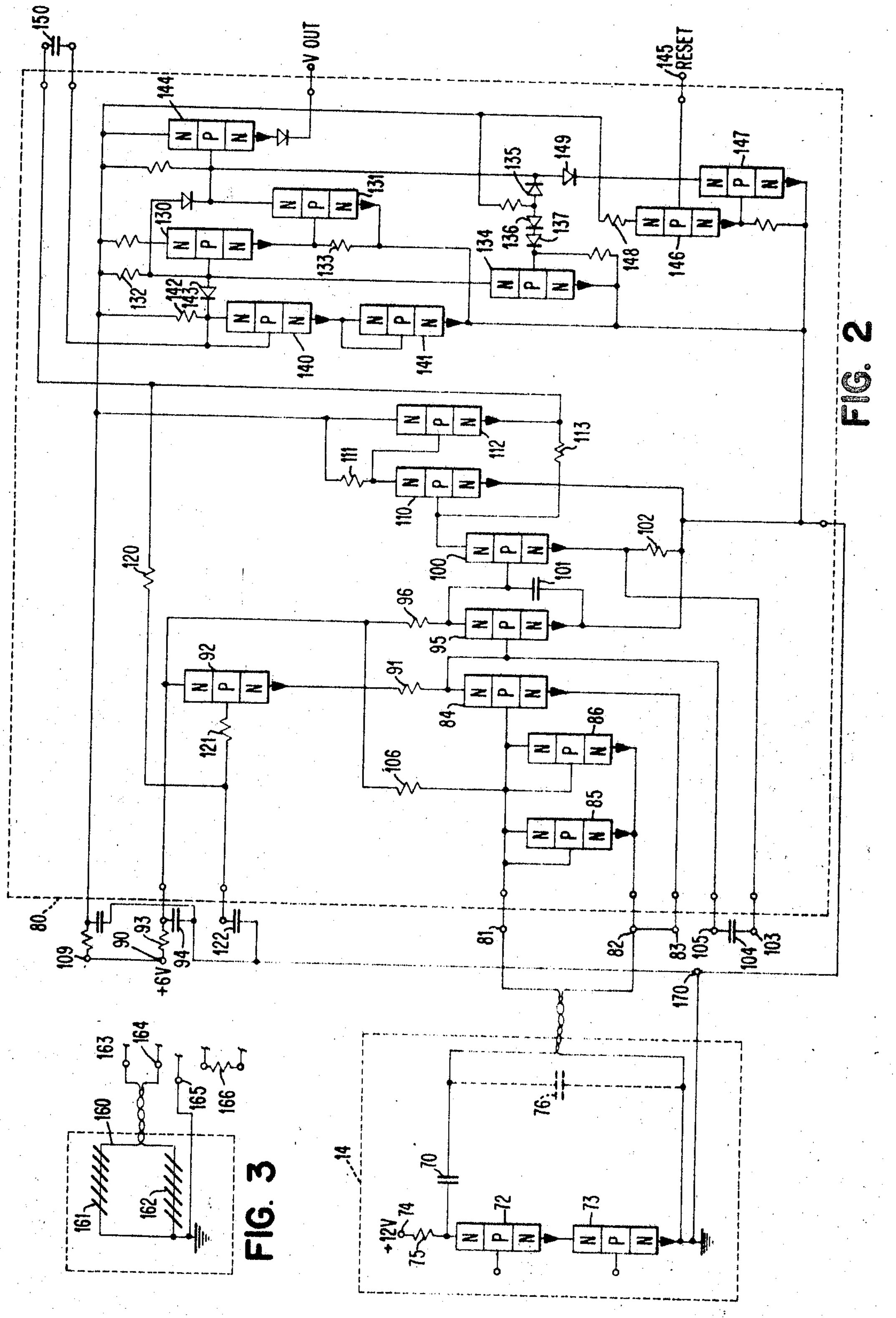

In the drawings:

FIGS. 1 and 2 are schematic diagrams illustrating sense amplifier-threshold detector circuits incorporating the teachings of the present invention; and FIG. 3 is a fragmentary schematic diagram illustrating a magnetic core storage array.

The sense amplifier and threshold device of FIG. 1 is for the most part fabricated on a single monolithic semiconductor chip illustrated by the broken line 1. The improved device comprises an amplifier section and a threshold detector section. The amplifier section comprises a three-stage amplifier. Transistors 2 and 3 are connected in parallel to form the first stage; transistor 4 forms the second stage; and transistor 5, the third stage.

The threshold detector section comprises a common base transistor switch 6, an emitter follower transistor 7 and a pair of transistors 8 and 9 connected in the form of a differential amplifier, the outputs of which are connected to a pair of emitter follower transistors 10 and 11.

The base and emitter electrodes of the first stage transistors 2 and 3 are connected to a capacitor storage array 14, input terminals 15 and 16 and an input circuit 17 comprising a series-connected resistor 18 and diode 19 and a parallel-connected resistor 20. The diode 19 and the transistors 2 and 3 have matching current-voltage characteristics. The base electrodes of the transistors 2 and 3 are also connected to a positive supply terminal 25 by way of a Zener diode 26 and resistors 27 and 28. The collector electrodes of the transistors 2 and 3 are connected to a voltage divider junction A by way of a load resistor 29. Junction A is maintained at a predetermined positive level determined by the series circuit comprising a pair of Zener diodes 31 and 32 and a series-connected resistor 33. The diodes also decouple signals from the power supply.

The transistors 2 and 3 form a common emitter amplifier. A resistor 34 provides emitter degeneration for stabilizing the gain of the first stage. The resistor 18 and the diode 19 have a negligible effect on the alternating-current characteristics. They are used for direct-current biasing the amplifier. By bringing a double-ended signal from the input terminals 15 and 16 to the base and emitter electrodes of the transistors 2 and 3, common mode rejection is attained. A resistor 30 in combination with resistors 18, 27 and 34 improves common mode rejection of noise on the array ground by balancing the line with respect to such noise.

The base electrode of the transistor 4 is connected to the collector electrodes of the transistors 2 and 3. The emitter electrodes of the transistor 4 is connected to ground potential and the collector electrode is connected to the junction A by way of a load resistor 35. The base electrode of the transistor 5 is connected to the collector electrode of the transistor 4, and its emitter electrode is connected to ground potential by way of a resistor 36. The collector electrode of the transistor 5 is connected to the positive supply terminal 25 by way of the resistor 28 and a feedback resistor 40. A feedback capacitor 41 external to the monolithic chip couples the emitter electrode of the transistor 5 to the base electrode of the transistor 4.

The transistors 4 and 5 comprise a second emitter to first base feedback amplifier which both amplifies the output signal from the transistors 2 and 3 and also integrates the signal by means of the capacitive feedback element 41.

The feedback which is provided around the major loop by means of the resistor 40 stabilizes the direct-current bias levels of the transistors 2–5 inclusive. A capacitor 42 rolls off the major loop gain so that at the input signal frequencies the major loop feedback has a negligible effect on the gain. In addition, the capacitor 42 filters noise which exists on the voltage supply terminal 25. The capacitor 42 also minimizes noise at the output junction B of the sense amplifier. Since the emitter of the transistors 2–5 are returned to ground potential rather than to voltage supply levels, the need for additional decoupling capacitors is eliminated.

The direct-current feedback around the major loop of the amplifier allows the base-emitter voltage drop of each of the transistors 4 and 5 to bias the previous transistor at a precise level. This permits the use of transistors of the same conductivity type, a practical limitation in the present monolithic fabrication technology. More particularly, the transistor 5 determines the direct-current operating point of the transistor 4 by clamping the collector electrode of the transistor 4 to the base-emitter voltage drop of the transistor 5. This clamping voltage is greater than the collector saturation voltage of the transistor 4, a characteristic readily achieved in the monolithic fabrication of silicon transistors. With fixed voltages applied to the terminals of the resistor 35, the value of the resistor is selected to provide the desired collector current $I_1$ for the transistor 4, the base current of the transistor 5 being negligible. Similarly, the transistor 4 clamps the collector electrodes of the transistors 2 and 3 to a voltage slightly above the saturation voltage, and the value of the resistor 29 is selected to provide the desired collector current.

Since direct-current stabilization is provided around the major loop of the amplifier, the integrating feed back from the emitter of the transistor 5 to the base of the transistor 4 does not require a direct-current path, i.e. a resistor. With merely the capacitor 41 in the minor feedback loop, a better integrating action is achieved since the time constant of the integrator circuit is now not limited by a parallel resistor. This improved integration significantly reduces the repetition rate sensitivity and the raise time sensitivity and improves the signal-to-noise ratio of the circuit.

The common base transistor switch 6 of the threshold detector section has a capacitor 50 coupled across its emitter and collector electrodes. With no data signal at the output terminal B of the amplifier, the common base switch 6 is turned on to clamp its emitter electrode to the voltage drop across its base-emitter junction.

The emitter electrode of the transistor 7 is coupled to a negative supply terminal 51 by way of a pair of resistors 52 and 53. A resistor 54 is connected across the base-emitter electrodes of the transistor 7. The collector electrode of the transistor 7 is connected to a positive supply terminal 55.

A pair of voltage dividers comprising resistors 56, 57 and 58, 59 has its intermediate junctions connected to the collector electrodes of the transistors 8 and 9. The emitter electrodes of the latter transistors are connected to the supply terminal 51 by way of common resistors 60 and 53. A bypass capacitor 61 connects the resistor 53 to ground potential.

The capacitor storage array 14 may be one of many types well known in the art. For ease of illustration, it will be assumed that the array is of the "read-only" storage type—i.e. the data stored in the array is fixed. The amplifier-detector 1 is connected to a plurality of capacitors (not shown) similar to the capacitor 70 by way of the cable 71. Stray capacitance in the array is illustrated at 76. Each capacitor such as 70 is connected to a respective pair of decode-drive transistors such as 72, 73. The transistors 72, 73 are normally nonconducting, whereby a positive potential will be applied to the capacitor 70 over a circuit extending from a positive supply terminal 74, a resistor 75, the capacitor 70, one wire of the cable 71, the resistor 20 (and the transistors 2, 3) and the other wire of the cable 71 to ground potential. When decode selection means (not shown) energizes the transistors 72, 73, the transistors apply ground potential to the left plate of the capacitor 70; and the capacitor applies a negative pulse to the base electrodes of the transistors 2, 3. Thus pulse is typically in the form of a sharp differentiated spike of current.

In the absence of a data signal at the junction B, the transistor 6 as mentioned above, is conducting to apply a negative potential equal to its base-emitter drop to the base electrode of the emitter follower 7. This in turn causes a more negative potential equal to the base-emitter drops of both transistors 6 and 7 to be applied to the base electrode of the transistor 8.

Since the base electrode of the transistor 9 is connected to ground potential, the latter transistor will be conducting and the transistor 8 will be turned off. As a result, the transistors 10 and 11 will be respectively on and off to produce at their output terminals 62 and 63 relatively positive and negative potential levels.

When a negative-going current spike from the array 14 is applied to the amplifier input terminals 15 and 16, it is amplified, integrated and inverted to produce a positive-going voltage signal at the junction B. This positive signal is coupled by the capacitor 50 to the emitter electrode of the transistor 6 to turn the latter off. This positive signal at the base electrode of the emitter follower 7 produces a positive potential at the emitter electrode of the latter transistor; and if the voltage at the emitter electrode is more posiive than ground, the transistor 8 will turn on and the transistor 9 will turn off. In order to switch the transistors 8 and 9, the positive signal appearing at the terminal B must exceed for a predetermined minimum time duration the threshold level (approximately one and four-tenths volt) which is determined by the two voltage drops across the base-emitter electrodes of the transistors 6 and 7. At the end of the pulse at B, the transistors 8 and 9 switch back to their initial states.

When the transistors 8 and 9 turn on and off respectively, negative and positive output pulses are produced buffered by transistors 10 and 11.

Significantly increased reliability is achieved by the improved threshold circuit. For optimum operation, the voltage level at the emitter electrode of the transistor 6 must precisely follow the positive-going data pulse which appears at the terminal B. In addition, this level must be maintained at the emitter electrode for the duration of the input pulse. However, in the previous art, there was a definite time constant associated with the voltage at the emitter electrode of the transistor 6; that is, a decay toward the negative potential at the terminal 51. For optimum operation, this time constant must be made as long as possible. This same time constant circuit, however, also determines the bias current of the transistor 6; and, unless the bias current is maintained at a sufficiently high value to set a low impedance at the emitter electrode of the transistor 6, determined by the $h_{ib}$, the common base small-signal short-circuit input impedance (emitter input), of the transistor, there will be an uncertainty in the threshold level.

More particularly, the minimum required pulse width of the output signal of the threshold detector in a typical environment is in the order of eighty nanoseconds. Therefore, the threshold level must be exceeded at the base electrode of the transistor 7 for at least the eighty nanoseconds to assure reliable operation. If the voltage at this base electrode decays at too rapid a rate, a substantial overdrive in the input voltage is necessary; and this, of course, introduces a significant uncertainty to the operation of the apparatus.

If the charge circuit of the capacitor 50 were of the conventional type having the usual exponential time constant and this time constant were too short due to the base bias requirement of the transistor 6, the charge built up across the capacitor becomes larger requiring a longer time interval for the transistor 6 to completely discharge the capacitor. This in turn makes the circuit repetition rate sensitive.

The bias current for the transistor 6 is determined essentially by the value of the resistor 54, and the base-emitter voltage drop of transistor 7. Transistor 7 and resistor 54 act as a current source which provides a slow linear decay to inhibit excessive charge build up. The value of the resistor 54 is made sufficiently low so that the bias current of the transistor 6 is sufficiently high to assure a predictable base-emitter drop. The value of this bias current is essentially equal to the voltage drop across the base-emitter electrodes of the transistor 7 divided by the value of the resistor 54. Although the value of the resistor 54 can be made relatively small, nevertheless, the impedance seen by the capacitor 50 is very high due to the positive feedback around the resistor 54. The capacitor 50 sees this high impedance under all signal conditions. Since the capacitor 50 sees a high impedance under all signal conditions, the decay time associated with the voltage appearing at the emitter electrode of the transistor 6 is very long; and this voltage therefore very closely approximates the input voltage at the junction B when a data signal is applied. This results in a more predictable threshold level.

In addition, the high impedance seen by the capacitor 50 prevents excessive charge build up across the capacitor, so that the capacitor is quickly discharged by the transistor switch 6 during the time interval between data signal pulses. This significantly improves the insensitivity of the circuit to the pulse repetition rate.

Suitable operation of an amplifier of the type illustrated in FIG. 1 can be achieved utilizing the following component values; it will be appreciated, however, that these values are given merely by way of example:

| Resistors: | Value in ohms |
|---|---|
| 18 | 34 |
| 20 | 5 |
| 27, 57, 59 | 3000 |
| 28, 30, 40, 54 | 1000 |
| 29 | 3900 |
| 33 | 700 |
| 34, 36 | 20 |
| 35 | 7500 |
| 53 | 22 |
| 52 | 900 |
| 56, 58 | 2000 |
| 60 | 500 |

| Capacitors: | | Values |
|---|---|---|
| 41 | picofarads | 50 |
| 42 | microfarads | 10 |
| 50 | picofarads | 600 |
| 61 | microfarad | .1 |

The embodiment of FIG. 2 has been specifically designed for an environment having only one power supply (e.g., positive) at low voltage levels (e.g., six).

The embodiment of FIG. 2 includes a sense amplifier and threshold detector, preferably formed on a single monolithically fabricated chip 80. Input terminals 81 and 82 are connected to the capacitor array 14. An additional input terminal 83 is connected directly to the input terminal 82.

The input terminals 81 and 82 are also connected to the base and emitter electrodes of a transistor amplifier

84. A pair of transistors 85 and 86 have their base and collector electrodes connected together to act as diodes. These diodes are connected across the base-emitter terminals of the transistor amplifier 84.

This arrangement of transistors 85, 86 connected to operate as diodes and connected across the base-emitter input terminals of an inverting amplifier 84 forms a part of the subject matter of applicant's co-pending U.S. patent application Ser. No. 513,395, filed Dec. 13, 1965, and assigned to the assignee of the present application, issued July 9, 1968, as U.S. Patent No. 3,392,342. Said co-pending application is hereby incorporated herein by reference as if it were set forth in its entirety.

As discussed more fully in said co-pending application, the arrangement of the transistors 85, 86 in shunt with the base-emitter junction of the transistor amplifier 84 on a single monolithic chip provides an improved inverting amplifier having a low input impedance with a high degree of gain stability with changes in supply voltage and ambient temperature. The transistors 84, 85 and 86 are all formed in very close proximity to each other on the same monolithic chip, and consequently they have essentially matched current-voltage characteristics. Since the base-emitter terminals of each of the transistors are connected directly in parallel, their base currents will be equal to each other; and, therefore, their collector currents will be equal to each other. Since the amplifiers are biased to operate in their linear region, the base currents of the transistors are extremely small compared with the collector currents and can, therefore, be neglected. Consequently, the collector current of the transistor 84 will be substantially equal to the collector current of each of the transistors 85 and 86. Since substantially all of the input current from the array 14 applied to the terminals 81, 82 passes through the collectors of the transistors 85 and 86, the collector current of the transistor 84 will be the input current divided by two. This relationship will hold for wide variations in supply potential levels and temperature.

Accordingly, the transistor amplifier 84, together with its input circuit comprising the transistors 85 and 86, is significantly superior to the corresponding transistor amplifier and input circuit of the embodiment of FIG. 1. It will be appreciated that the first stage of the sense amplifier of FIG. 1 can be modified to utilize the improved input circuit.

With the gain stability provided by the transistors 85 and 86 it is now possible to connect the capacitive array 14 directly to both the base and emitter terminals of the transistor amplifier 84. This obviates the need for the bias stability resistors and common mode rejection resistors required in the embodiment of FIG. 1, i.e. the resistors 18, 34 and 30 and diode 19. Thus greater simplicity of circuit design, and superior performance are provided.

The collector electrode of the transistor amplifier 84 is connected to a positive supply terminal 90 by way of a resistor 91, an emitter follower transistor amplifier 92 and a decoupling resistor 93. A decoupling capacitor 94 connects the junction between the resistor 93 and the amplifier 92 to ground potential. The collector electrode of the amplifier 84 is also connected to the base electrode of the transistor amplifier 95.

The collector electrode of the amplifier 95 is connected to the supply terminal 90 by way of the resistor 93 and a resistor 96, and its emitter electrode is connected to the circuit ground. The collector electrode is also connected to the base electrode of a transistor amplifier 100 and to the circuit ground by way of a capacitor 101.

The emitter electrode of the amplifier 100 is connected to the circuit ground by way of a resistor 102, and to the base electrode of the amplifier 95 by way of terminals 103 and 105 and capacitor 104. The amplifiers 95 and 100 form a second emitter to first base feedback amplifier wherein the feedback capacitor 104 is utilized to integrate the incoming current spike signal. Resistor 106 is a bias resistor for the input circuit of the amplifier 84.

The collector electrode of the transistor amplifier 100 is connected to the base electrode of an inverting transistor amplifier 110. The emitter electrode of the amplifier 110 is connected to the circuit ground, and its collector electrode is connected to the positive supply terminal 90 by way of a resistor 111 and a resistor 109. The collector electrode of the amplifier 110 is also connected to the base electrode of an emitter follower transistor amplifier 112. The amplifiers 110 and 112 form a second emitter to first base feedback amplifier, including a feedback resistor 113. The collector electrode of the amplifier 112 is connected to the positive supply terminal 90 by way of the resistor 109.

Feedback around the major loop of the sense amplifier is provided by a resistor 120 which is connected between the emitter electrode of the amplifier 112 and the collector electrode of the amplifier 84 by way of the emitter follower 92 and its base resistor 121. A capacitor 122 connects the junction between the resistors 120 and 121 to ground potential and rolls off the direct-current loop gain so that the major loop feedback has essentially no effect at the signal frequencies.

The amplifiers 95, 100, 110 and 112, together with the collector resistors of the amplifiers 84, 95, 100 and 110, respectively, fix the direct-current bias operating point of the transistor amplifiers 84, 95, 100 and 110, respectively, in much the same manner as that described with respect to the cascade-connected amplifiers in FIG. 1. The operating point of the last transistor amplifier 112 is determined essentially by the feedback around the major loop.

When a negative-going current spike representative of a data signal is applied to the terminal 81, this signal is inverted and amplified by the amplifier 84 and applied to the transistors 95 and 100 for amplification and integration. The integrated signal is then applied to the stage comprising the amplifiers 110 and 112. The negative input signal will produce at the emitter electrode of the amplifier 112 a negative-going integrated pulse.

The last stage of the sense amplifier comprising the transistors 110 and 112 presents a low output impedance to the threshold detector. This results in a much lower time delay encountered by the input signal passing through the sense amplifier.

It will be recalled that, in the embodiment of FIG. 1, a negative input signal to the sense amplifier produced at its output terminal B to a positive-going pulse. It will also be recalled that both positive and negative supplies were provided in the embodiment of FIG. 1. However, the specific embodiment of FIG. 2 is designed for use in systems wherein only one low voltage power supply is available.

Without both positive and negative supplies available, and with a negative rather than a positive-going output pulse from the sense amplifier, the use of the transistor 6 of FIG. 1 for setting a very precise threshold and for very rapidly discharging the capacitor 50 is no longer possible. Present technology involves more fabrication steps to form PNP transistors as well as NPN transistors on the same monolithic chip. Since the transistors 85, 86, etc. of FIG. 2 are of the NPN type, all transistors on the chip are necessarily of the NPN type for easier fabrication. The application of a negative-going signal rather than a positive-going signal to the collector electrode of the transistor 6 of FIG. 1 will not produce the desired mode of operation. Instead, the base collector junction of the transistor 6 would become highly forward biased.

As a result, a different threshold device is utilized in the embodiment of FIG. 2. This threshold circuit will now me described in detail.

The threshold device includes a latch comprising a first pair of transistors 130, 131 normally biased to their conductive states by means of a base bias circuit extending from the supply terminal 90 through the resistor 109 and resistors 132 and 133 to ground potential. The collector electrode of the transistor 131 is connected to the base electrode of a third transistor 134 by way of a gate circuit including diodes 135–137, inclusive, and a bias resistor 138. The collector electrode of the transistor 134 is connected to the base electrode of the transistor 130 to complete the latch feedback loop.

When the transistors 130 and 131 are conducting, ground potential is applied to the base electrode of the transistor 134 by way of the emitter-collector circuit of the transistor 131 and the diode 135 to maintain the transistor 134 off. In the event that the transistor 134 is turned on in response to the transistor 130 and 131 being turned off, ground potential is applied to the base electrode of the transistor 130 by way of the emitter-collector circuit of the transistor 134 to maintain the transistors 130 and 131 in their nonconducting state.

Transistors 140 and 141, connected to operate as diodes, are maintained in their low impedance states by means of a bias circuit extending from the positive supply terminal 90 through the resistor 109 and a resistor 142. Normally, the conducting diodes 140 and 141 maintain a voltage of approximately one and four-tenths volt on the cathode of a coupling diode 143. Also when the transistors 130 and 131 are conducting, they apply a similar one and four-tenths volt potential to the anode of the diode 143. As a result, the diode 143 is maintained normally in its high impedance state.

The output of the threshold detector is taken from the emitter electrode of an emitter follower transistor amplifier 144, the base electrode of which is connected to the collector electrode of the transistor 131.

The specific threshold detector circuit illustrated in FIG. 2 is intended for use in a system wherein the detector is intended to be positively reset by computer control means, rather than to reset itself at the end of a data pulse. Consequently, a reset input terminal 145 is shown connected to the base electrode of a transistor amplifier 146. The emitter electrode of the amplifier 146 is connected to the base electrode of a common emitter transistor amplifier 147. The collector electrode of the amplifier 146 is connected to the positive supply terminal 90 by way of a resistor 148 and the resistor 109. The collector electrode of the amplifier 147 is connected to the gate input circuit of the latch transistor 134 by way of a diode 149.

Assuming that the latch is set in a state wherein the transistors 130 and 131 are nonconducting and the transistor 134 is conducting and that a positive-going reset signal is applied to the base electrode of the transistor 146 via the reset terminal 145, the transistors 146 and 147 will be turned on. The transistor 147 will apply ground potential to the base input circuit of the transistor 134 to turn the latter off. When the transistor 134 turns off, the transistors 130 and 131 will be turned on.

The output terminal of the sense amplifier is coupled to the input terminal of the threshold detector circuit by way of a coupling capacitor 150. When a negative-going current spike from the array 14 is applied to the base electrode of the amplifier 84, an integrated negative-going pulse appears at the output of the sense amplifier and is applied to the cathode of the diode 143 by means of the capacitor 150. This negative-going pulse will force the transistors 140 and 141 to their high impedance states; and, if the data pulse equals or exceeds the threshold level set by the voltage required to forward bias the diode 143, current will be diverted from the base bias circuits of the transistors 130 and 131 to the diode 143 to turn the latter transistors off. The transistor 134 will be turned on to maintain the transistors 130 and 131 off until the next positive-going reset pulse is received.

It will be appreciated that a latch type threshold device generally of the type shown in FIG. 2 may be utilized with the sense amplifier illustrated in FIG. 1. It will, of course, be necessary to modify the latch so that it responds to positive-going, rather than negative-going input signals.

It will also be appreciated that a threshold detector similar to that illustrated in FIG. 1 may be utilized with a sense amplifier of the type illustrated in FIG. 2, assuming that suitable positive and negative supplies are available, and assuming further that the output signal of the sense amplifier is positive-going rather than negative-going.

FIG. 3 diagrammatically illustrates a storage array utilizing bistable magnetic cores. A sense line 160 is threaded through groups of cores 161 and 162 and connected to terminals 163 and 164 by way of a twisted wire pair. Assuming that it is desired to detect output signals from the core storage array by means of the sense amplifier and threshold detector of FIG. 1, the terminals 163 and 164 of FIG. 3 are connected respectively to the input terminals 15 and 16 of FIG. 1; and the resistor 20 is disconnected from the terminal 16. Since the output signals from a core storage device do not require integration, the capacitor 41 of FIG. 1 can be replaced by a resistor 166 (FIG. 3) of suitable value.

The sense amplifier of FIG. 2 leads itself more readily to use with both capacitive and core storage memories. In the event that it is desired to sense the output of the core storage device of FIG. 3 by means of the sense amplifier of FIG. 2, the terminals 163 and 164 of FIG. 3 are connected to the terminals 82 and 83, respectively, of FIG. 2. The wired connection between the terminals 82 and 83 is removed and the terminal 81 of FIG. 2 is left in a disconnected state. The ground array terminal 165 of FIG. 3 is connected to terminal 170 of FIG. 2. The resistor 166 of FIG. 3 is connected in place of the capacitor 104 of FIG. 2.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A sense amplifier for responding to output data signals on the sense line of a data storage array or the like, comprising power supply means having an reference potential terminal and a second terminal at a selected voltage level, a plurality of cascade-connected transistor amplifiers including a first input amplifier and a last output amplifier, each transistor having base, emitter and collector electrodes, each transistor having the characteristic at saturation of a larger voltage drop across the base-emitter junction than that across the emitter-collector electrodes, first direct-current means coupling each emitter and collector electrode respectively to the reference terminal and the second terminal, a direct-current negative feedback circuit means coupled between the first and last amplifiers of the sense amplifier normally maintaining direct-current operation of the last transistor in the cascaded plurality at a predetermined point in its linear region, second direct-current means coupling the base electrode of each transistor in the plurality except the first to the collector electrode of the next preceding transistor to clamp the collector of each said preceding transistor at a direct-current voltage level substantially equal to the base-emitter voltage drop of the transistor to which its collector electrode is coupled, said first coupling means including resistors of selected value connecting the collector electrodes of said preceding transistors to the second supply terminal to maintain the direct-current operation of their respective transistors at predetermined points in their linear region, a capacitor coupled to the negative feedback circuit means for rolling off the direct-current loop gain to provide substantially open loop operation at data input signal frequencies, the first transistor amplifier in the cascaded plurality including an input circuit of selected impedance value coupling data signals to the base and emitter electrodes thereof and providing common mode rejection of noise signals on the array ground.

2. The sense amplifier of claim 1 wherein the transistor amplifiers are monolithically fabricated on a single semiconductor chip.

3. The sense amplifier of claim 1 together with a feedback capacitor coupled from the emitter electrode of one of the transistor amplifiers to the base electrode of the next preceding transistor amplifier for integrating input signals to the latter amplifier.

4. The sense amplifier of claim 3 wherein said input circuit of the first transistor amplifier further comprises a low impedance connected in parallel with the base-emitter junction of the first transistor for sensing the the differentiated current output signals of a capacitor storage array.

5. The sense amplifier of claim 4 wherein said low impedance comprises at least one transistor with its base and collector electrodes connected directly to the base electrode of the first amplifier and its emitter electrode connected directly to the emitter electrode of the first amplifier, said one transistor having voltage-current characteristics substantially matching those of the first amplifier to stabilize the gain of the first amplifier.

6. The sense amplifier of claim 5 wherein the transistor amplifiers and said one transistor are monolithically fabricated on a single semiconductor chip.

7. The sense amplifier of claim 1 together with a threshold detector circuit for producing bivalued output pulses in response to data signals from the sense amplifier.

8. The combination set forth in claim 7 wherein the threshold detector circuit comprises a transistor switch having an input and operable in one of two different states in response to data signals which equal or exceed a predetermined threshold value, an emitter follower having its output connected to the input of the switch and having a resistor connected across its base-emitter electrodes, a capacitor coupling data signals from the sense amplifier to the base electrode of the emitter follower, and a grounded base transistor switch having its collector and emitter electrodes connected across the coupling capacitor and effective between data pulses to discharge the latter capacitor and to establish a predetermined voltage level at the base electrode of the emitter follower.

9. A threshold detector circuit for producing at an output terminal bivalued signals in response to data signals at an input terminal which equal or exceed a predetermined threshold value, comprising a power supply including first and second terminals and an intermediate reference terminal, a grounded base transistor switch having its base electrode connected to the intermediate reference terminal, having its collector electrode connected to the input terminal and normally energized to clamp its emitter electrode to a predetermined voltage below the threshold value, an emitter follower including a base electrode connected to the emitter electrode of the switch and its collector and emitter electrodes coupled to the first and second terminals, a capacitor connected between the input terminal and the base electrode of the emitter follower for coupling data signals to the emitter follower and for de-energizing the switch incident to the receipt of each signal at the input terminal, a second transistor switch connected to the output of the emitter follower and responsive to data signals which exceed the threshold value determined by the emitter voltage drops across the grounded base transistor switch and the emitter follower, and a current source including a resistor connected across the base-emitter electrodes of the emitter follower for supplying base current to the grounded base transistor switch between data pulses and presenting a high impedance to the capacitor during data pulses to maintain charging of the capacitor at a low linear rate, said grounded base transistor switch effective to rapidly discharge the capacitor upon termination of an input signal.

References Cited

UNITED STATES PATENTS

| | | | |
|---|---|---|---|
| 3,366,889 | 1/1968 | Avins | 330—19 |
| 3,399,357 | 8/1968 | Weilerstein | 330—22 |

ARTHUR GAUSS, Primary Examiner

S. D. MILLER, Assistant Examiner

U.S. Cl. X.R.

307—237, 238, 303; 330—28, 30

PO-1050
(5/69)

UNITED STATES PATENT OFFICE
CERTIFICATE OF CORRECTION

Patent No. 3,464,318 Dated September 2, 1969

Inventor(s) William J. Thayer and Kenneth D. Garnjost

It is certified that error appears in the above-identified patent and that said Letters Patent are hereby corrected as shown below:

Column 10, line 30, change "and" to --or--.

Column 16, line 68, change "ot" to --to--.

Column 18, line 24, delete "load"; and line 41, delete "conditions to compensate for deflection of said structure,".

Column 23, line 52, after "establishing" insert --fluid--.

Column 24, line 55, after "fluid" insert --with respect to said drive faces, force feedback means operatively interposed between said third stage valve member and said pressure regulating member, first feedback conduit means operatively interposed in fluid conducting communication between one of said second end areas and one of said load conduits, second feedback con- --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents